(12) United States Patent
Dufoure et al.

(10) Patent No.: US 9,272,722 B2
(45) Date of Patent: Mar. 1, 2016

(54) TRAY HAVING IMPROVED RIMS, FURNITURE INCLUDING ONE SUCH TRAY, AND CORRESPONDING TOOL TROLLEY

(75) Inventors: Didier Dufoure, Feuquieres en Vimeu (FR); Benoit Ozenne, Dargnies (FR); Stephane Thirouin, Lyons (FR); Benoit Tillet, Sucy en Brie (FR)

(73) Assignee: Stanley Works (Europe) GmbH, Dubendorf (CH)

( * ) Notice: Subject to any disclaimer, the term of this patent is extended or adjusted under 35 U.S.C. 154(b) by 15 days.

(21) Appl. No.: 13/984,053

(22) PCT Filed: Jan. 25, 2012

(86) PCT No.: PCT/EP2012/051162
§ 371 (c)(1),
(2), (4) Date: Aug. 7, 2013

(87) PCT Pub. No.: WO2012/107292
PCT Pub. Date: Aug. 16, 2012

(65) Prior Publication Data
US 2013/0307387 A1  Nov. 21, 2013

(30) Foreign Application Priority Data
Feb. 8, 2011 (FR) ...................................... 11 00385

(51) Int. Cl.
  *B25H 1/02*  (2006.01)
  *B62B 3/02*  (2006.01)
  *B25H 1/14*  (2006.01)
  *B25H 1/20*  (2006.01)
  *B62B 3/00*  (2006.01)

(52) U.S. Cl.
  CPC .. *B62B 3/02* (2013.01); *B25H 1/14* (2013.01); *B25H 1/20* (2013.01); *B62B 3/002* (2013.01)

(58) Field of Classification Search
  CPC .............. B25H 1/16; B25H 1/14; B25H 1/20; B62B 3/02; B62B 3/002
  USPC ............. 312/21, 126, 204, 272, 272.5, 249.1, 312/249.8, 298, 304, 306, 350, 902; 108/27
  See application file for complete search history.

(56) References Cited

U.S. PATENT DOCUMENTS

| | | | | | |
|---|---|---|---|---|---|
| 2,019,455 | A | * | 10/1935 | Lehman ......................... | 312/312 |
| 3,297,387 | A | * | 1/1967 | Parsons ......................... | 312/290 |
| 3,494,503 | A | * | 2/1970 | Kingsley ....................... | 312/306 |
| 3,707,316 | A | * | 12/1972 | Mark .......................... | 312/208.3 |
| 5,365,619 | A | * | 11/1994 | Solomon ........................... | 4/609 |
| 5,443,311 | A | * | 8/1995 | Kadlecek et al. ............. | 312/308 |
| 6,647,899 | B1 | * | 11/2003 | Lysien ............................ | 108/24 |

(Continued)

FOREIGN PATENT DOCUMENTS

GB       230138       3/1925

*Primary Examiner* — Daniel Rohrhoff
(74) *Attorney, Agent, or Firm* — Richard J. Veltman

(57) ABSTRACT

The placement tray (6) comprises a general plane (6a) and at least one rim (60, 80) movable between a rest position in which the or each rim (60, 80) is disposed so that it projects relative to the general plane (6a) and a working position in which the or each rim (60, 80) is aligned relative to the general plane (6a). The or each rim (60, 80) retracts automatically under the action of a load (F) which biases the or each rim (60, 80) from its rest position towards its working position, the load being placed on the upper surface of the tray (6) vertically above the or each rim (60, 80).

2 Claims, 4 Drawing Sheets

(56) References Cited

U.S. PATENT DOCUMENTS

Figure 1:
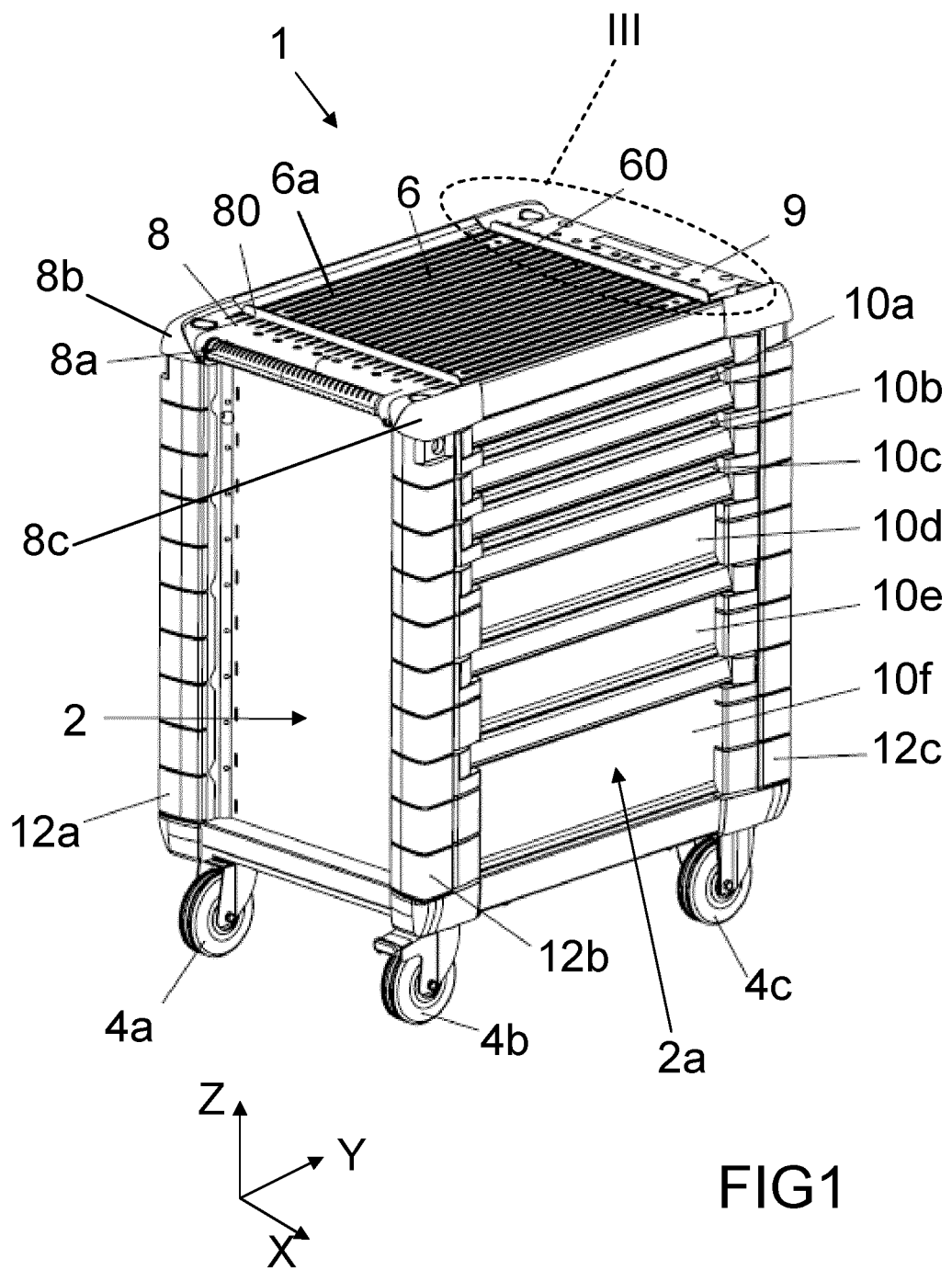

| | | | |
|---|---|---|---|
| 8,033,620 B2 * | 10/2011 | Retchloff | 312/312 |
| 8,480,188 B2 * | 7/2013 | Cao et al. | 312/223.3 |
| 8,851,585 B2 * | 10/2014 | Chang | 312/263 |
| 2002/0079069 A1 | 6/2002 | Cheng | |

* cited by examiner

TRAY HAVING IMPROVED RIMS, FURNITURE INCLUDING ONE SUCH TRAY, AND CORRESPONDING TOOL TROLLEY

The present invention relates to a tray of a furniture element comprising an upper surface intended for the placing of an object, the surface forming a general plane; at least one rim movable between a rest position in which the or each rim is disposed so that it projects relative to the general plane of the upper surface and a working position in which the or each rim is aligned relative to the general plane of the upper surface.

In the furniture sector it is known to place objects or loads on working planes. In particular, certain items of equipment are provided with trays having metal rims which can be folded manually. This type of arrangement allows two types of load configuration of the tray placing of an object. A first configuration consists of completely limiting the perimeter of the tray by rims which project relative to the placement plane. A second configuration consists of partially or totally releasing the perimeter of the tray from this edge. Nevertheless, manual operation does not allow a saving of time and the operator can forget to reconfigure the placement plane. Moreover, this arrangement does not allow an economical cost of manufacture of the assembly.

The object of the invention is to improve the design of a placement tray whilst decreasing the cost of manufacture.

For this purpose, the invention relates to a tray of the type referred to above, characterised in that the or each rim retracts automatically under the action of a load which biases the or each rim from its rest position towards its working position, the load being placed on the upper surface of the tray vertically above the or each rim.

Thus the invention confines certain objects in a limited space, whilst guaranteeing a clear plane for the placement of other objects.

According to other characteristics:

the or each rim is movable in a direction substantially perpendicular to the general plane of the upper surface;

the or each rim is biased by at least one restoring element acting against the action of the load which tends to move the or each rim from its rest position towards its working position, the or each rim resuming its rest position projecting from the general plane when the action of the load is cancelled;

the or each rim comprises an L shape having a long side and a short side respectively disposed substantially vertically and substantially horizontally;

a guide receives the long side of the L of the or each rim, and in that a compression spring disposed between a fixed abutment and the short side of the L tends to move the or each rim towards the rest position;

the tray has a substantially rectangular shape and comprises two retractable rims disposed parallel to one another in the direction of the tray of small dimension;

the tray comprises a plane, preferably made of wood, covered with a metal sheet, preferably profiled, and in that moreover it is disposed between two slotted end pieces, each of the two rims being disposed in the slot of the corresponding end piece;

at least one of the end pieces comprises at least one recess intended for the storage of objects.

The present invention also relates to an item of furniture comprising a load-bearing structure and at least one placement tray, characterised in that the or each tray is as described previously.

The present invention also relates to a movable workshop trolley comprising a box equipped with at least one drawer and provided with moving means, in particular castors, characterised in that a tray as described previously is disposed in the upper part of the box.

Figure 2:
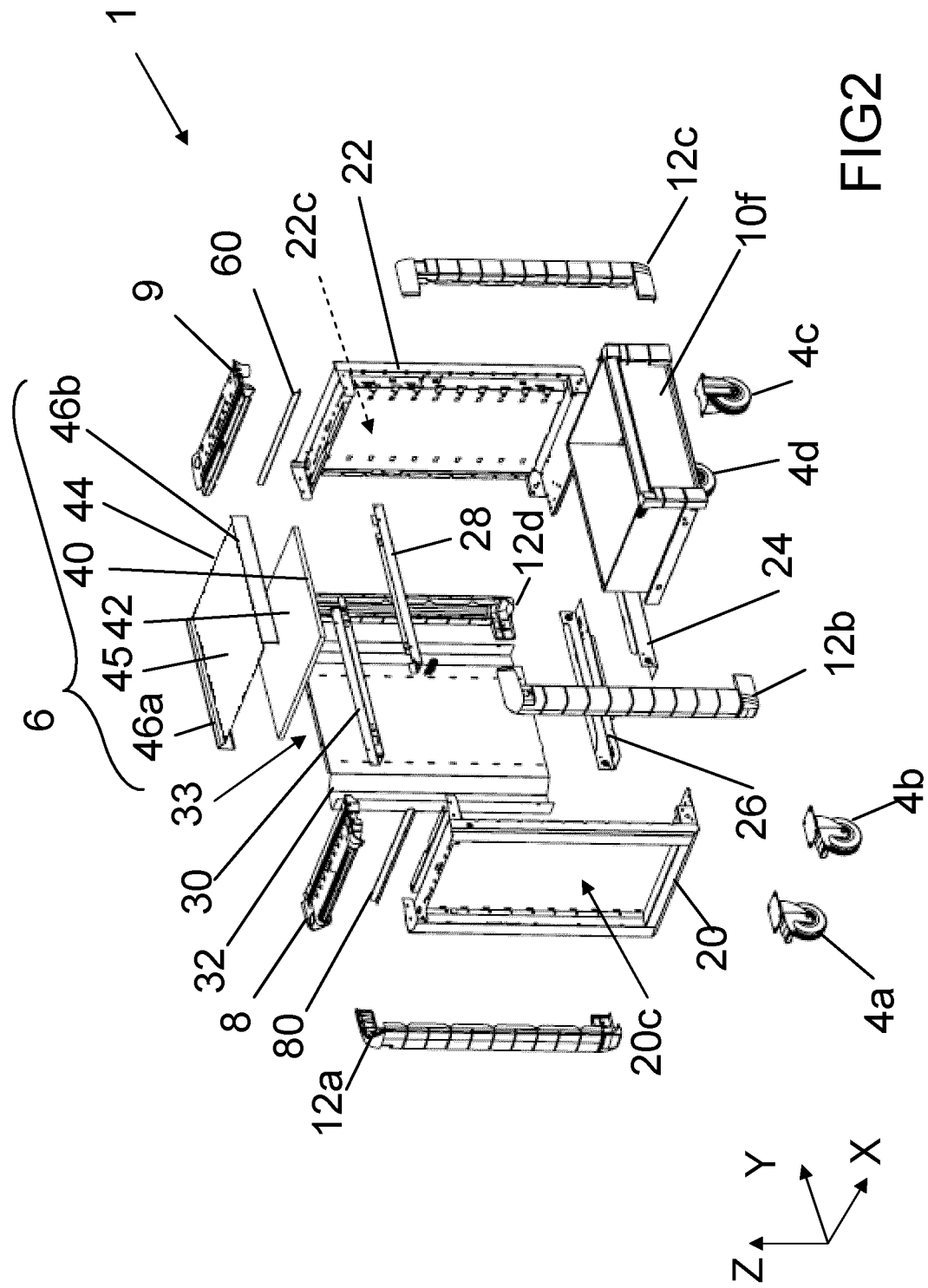
Figure 3:
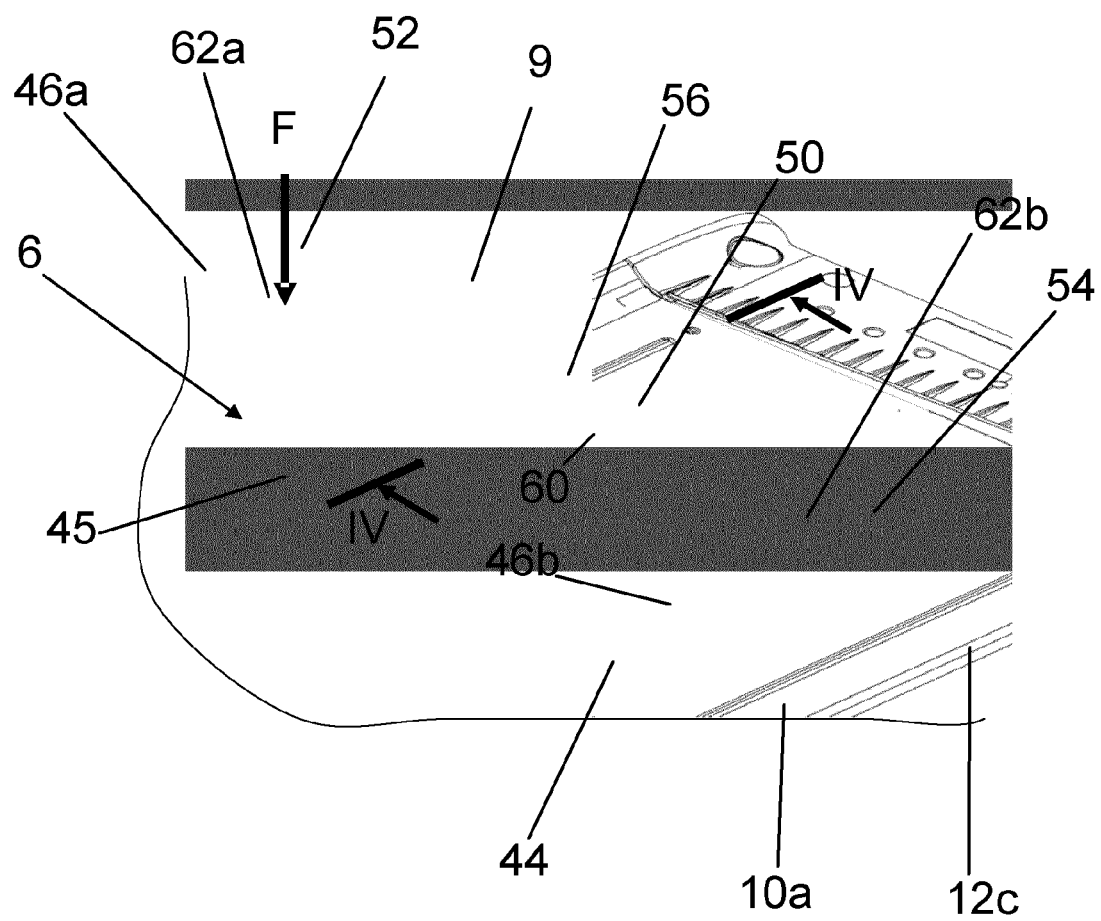
Figure 4A:
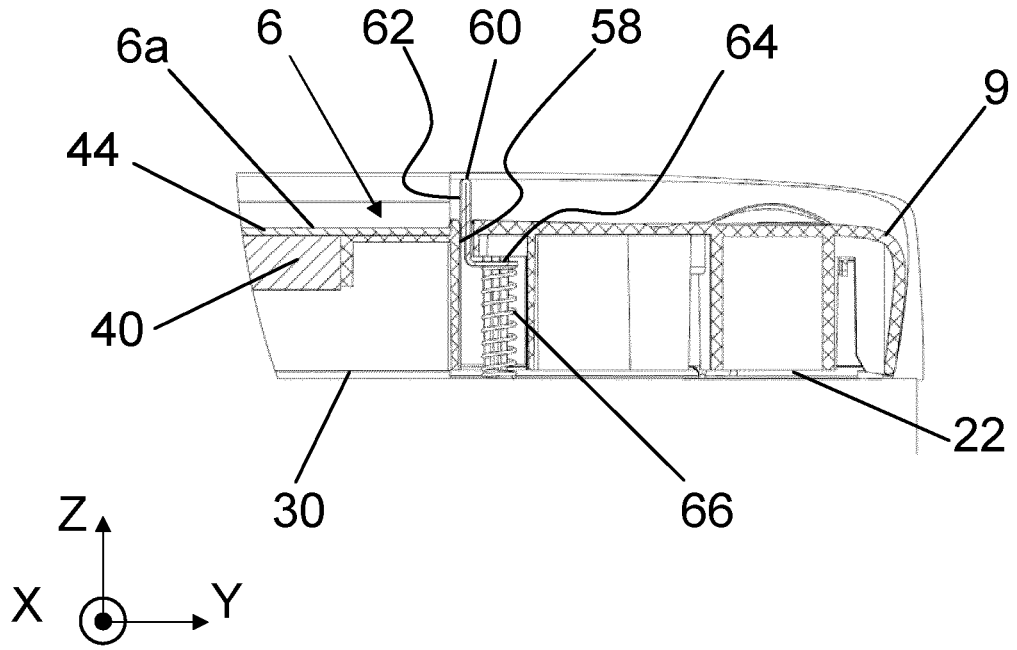
Figure 4B:
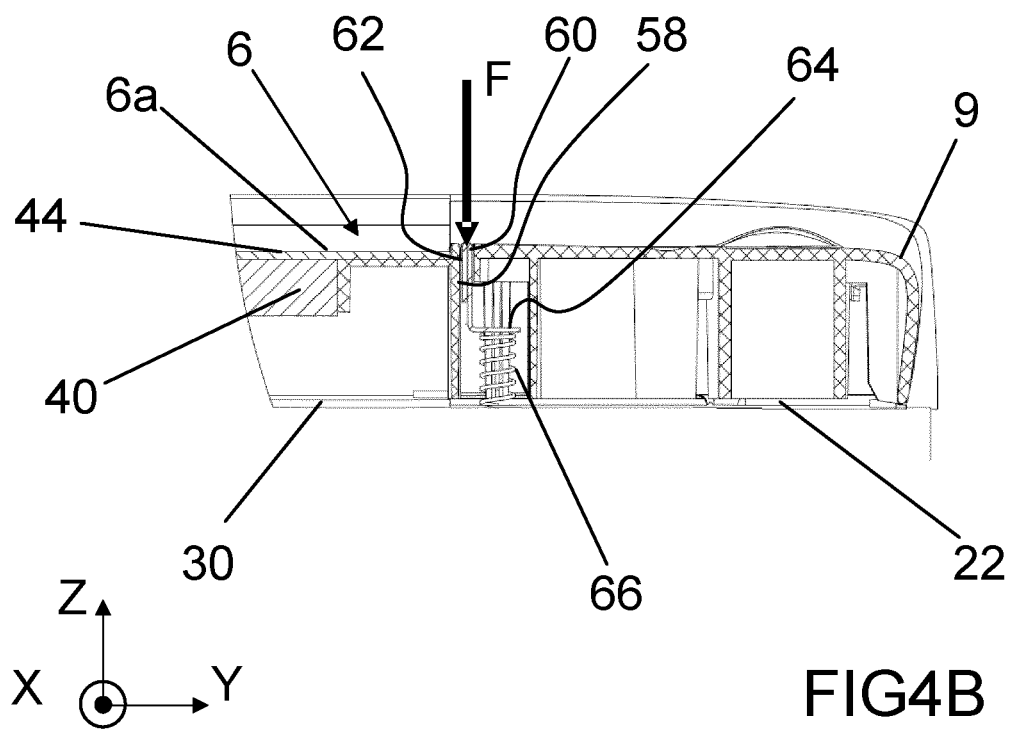

The invention and its advantages will be better understood when reading the following description given solely by way of example and with reference to the appended drawings, in which:

FIG. 1 shows a perspective view of an item of workshop furniture including a placement tray according to the invention, FIG. 2 shows an exploded perspective view showing the box of the item of furniture shown in FIG. 1, FIG. 3 shows a view on an enlarged scale of the detail III from the upper face of the item of furniture in FIG. 1, FIG. 4A shows a sectional view of the item of furniture of FIG. 3 along the line IV-IV according to a first configuration, FIG. 4B shows a sectional view of the item of furniture of FIG. 3 along the line IV-IV according to a second configuration.

In FIGS. 1 to 4A and 4B, the drawings are shown according to conventional orthogonal co-ordinates X, Y, Z, wherein the axis X represents the transverse axis, the axis Y represents the longitudinal axis and the axis Z represents the axis of the height. The references to the position should be understood relative to these co-ordinates. The terms "front" and "rear", "lower" and "upper" should be understood according to the orientation of FIGS. 1 to 4B.

FIG. 1 shows an item of furniture 1 such as a workshop trolley comprising, in a known manner, a furniture element 2 such as a box of generally parallelepipedal shape and provided with a front face 2a disposed substantially vertically. In its lower part the box 2 is equipped with moving means such as four means of movement such as four castors 4a, 4b, 4c, 4d (FIG. 2) and in its upper part it is equipped with a placement tray 6 intended to support various more or less bulky objects.

The upper tray 6 has a substantially rectangular shape, the direction of the short dimension extending along the axis X. It has an upper surface 6a intended for the placement of an object, the surface forming a general plane.

The tray 6 is disposed between a first end piece 8 having a handle 8a which extends transversely between two arms 8b and 8c and a second end piece 9 which may be identical to the first end piece 8 or which may have no handle.

The box 2 also comprises a series of drawers 10a to 10f of different heights, disposed one above the other along the axis Z, and intended to receive workshop tools for example. The drawers are mounted so as to be movable by sliding perpendicularly relative to the front face 2a of the box 2.

Four trims 12a to 12d (FIG. 2) are each disposed on one of the four vertical edges of the box 2. These trims make it possible to absorb light shocks, whilst ensuring a neat finish for the item of furniture.

In FIG. 2 the box 2 comprises two metal side panels 20 and 22 which are remote from one another. A front lower cross-member 24 and a rear lower cross-member 26 as well as a front upper cross-member 28 and a rear upper cross-member 30 connect the side panels 20 and 22. The lower cross-members 24 and 26 and upper cross-members 28 and 30 are metal and extend along the longitudinal axis Y of the item of furniture 1.

In its rear part the box 2 comprises a metal panel 32 connected to the side panels 20 and 22.

The side panels 20 and 22 and the rear panel 32 form respectively the side and rear faces of the parallelepiped, disposed substantially vertically and having respectively a hollow space 20c, 22c and 33 towards the interior of the box 2.

The different parts of the box 2 are assembled with one another by screw/nut systems and/or with rivets.

In FIG. 2, the tray 6 comprises a thick plane 40, preferably made of wood, of which the upper surface 42 is covered by a metal sheet 44, preferably profiled. This includes a transverse section comprising a central part 45 defining a general placement plane, limited by two longitudinal edges 46a and 46b having a profile projecting in relation to the general plane.

The end pieces 8 and 9 are clipped and/or screwed respectively on the side panels 20 and 22. The tray 6 is screwed to the box 2.

The arrangement of the box 2 is very advantageous in that it makes it possible to offer a range of furniture of which the longitudinal dimension along the axis Y can be modified from one model to another. In fact, the parts of the box 2 of which the dimension tends to vary are the cross-members 24, 26, 28, 30 and the panel 32. This arrangement limits the number of metal parts to be modified from one model to another, which has the consequence of also reducing the mass of models with a large longitudinal dimension.

The modular aspect of the box 2 requires a relatively simple adaptation of the longitudinal dimension of the tray 6. The plane 40 and the profiled sheet 44 are cut to the appropriate longitudinal dimension.

In FIG. 3 the end piece 9 of the trolley 1 is preferably obtained by moulding from plastics material and does not include a handle. The end piece 8 (FIG. 1) which includes an integral handle is likewise, preferably moulded from plastics material.

The end piece 9 extends along the axis X and comprises a central flat surface 50 disposed substantially in the plane of the central part 45 of the profiled sheet 44 of the tray 6. Two inclined flanks 52 and 54 integral with the surface 50 limit said surface laterally. The flanks 52 and 54 extend longitudinally substantially in alignment with the profiled edges 46a and 46b of the sheet 44, and join the trims 12c and 12d.

The surface 50 of the end piece 9 has at least one recess 56 intended for the storage of objects, in particular a series of recesses 56 each capable of receiving for example a blade of a tool.

At the joint of the tray 6 and the end piece 9, a first guide 58 (FIGS. 4A and 4B) extends parallel to the transverse axis X and receives a rim 60 projecting in relation to the plane of the central part 45 of the sheet 44 when said rim is at rest.

The rim 60 extends between the inclined flanks 52 and 54 of the end piece 9 a short distance from them. It is preferably metal, in particular made of sheet steel.

In a preferred embodiment, the end piece 9 includes from the moulding the transverse guide slot 58 into which the rim 60 is inserted.

The rim 60 is movable in a direction substantially perpendicular to the general plane of the upper placement surface 6a, between a rest position (FIG. 4A) in which it is disposed projecting in relation to the general plane and a working position (FIG. 4B) in which its free end is substantially in alignment with respect to the general plane.

The rim 60 has a transverse section having an L shape (FIGS. 4A and 4B) having a long side 62 and a short side 64 respectively disposed substantially vertically and horizontally in relation to the general placement plane.

The long side 62 is delimited by two rounded ends 62a and 62b.

The short side 64 is biased by at least one restoring element 66 (FIGS. 4A and 4B), in particular a compression spring of which one end is in fixed abutment relative to the panel 22 of the box 2 and the other end rests movably on the short side 64.

Under the action of a load F (FIGS. 3 and 4B) placed on the upper surface 6a of the tray 6 vertically above the rim 60, said rim retracts automatically from its rest position towards its working position.

The restoring element 66 acts against the action of the load F and tends to move the rim from its working position towards its rest position when the action of the load F is cancelled.

In the preferred embodiment, the end piece 8 having the manoeuvring handle 8a has a slot (not shown) similar to the slot 58 of the end piece 9. This slot receives a rim 80 (FIG. 1) of the same nature as the rim 60 and functions in the same way.

In an embodiment which is not shown, two compression springs bias each rim, each of the springs being positioned vertically above each end of the long side of the corresponding rim. Thus each end of the rim is retractable independently of the other end under the action of a load disposed in an appropriate manner, as shown in FIG. 3.

The description discloses an item of furniture 1 having a movable load-bearing structure 2 such as a box on castors. In a variant which is not shown, the item of furniture includes a load-bearing structure and at least one placement tray as described previously, preferably a plurality of trays.

In another variant which is not shown, the item of furniture 1 may be a fixed unit such as a kitchen base unit, having at least one working tray as described previously.

In general, the invention is applicable to any type of tray intended to serve as a working plane.

By virtue of the invention, the lightweight objects are confined in a limited space and cannot fall from the working plane. The heavy objects can be supported on a working plane at least partially free of inconvenient raised areas.

Moreover, the mode of production of the tray according to the invention permits an economic cost.

The invention claimed is:

1. Tray (6) of a furniture element (2), comprising an upper surface (6a) intended for the placing of an object, the surface forming a general plane, at least one rim (60, 80) movable between a rest position in which the or each rim (60, 80) is arranged so that it projects relative to the general plane of the upper surface (6a) and a working position in which the or each rim (60, 80) is aligned relative to the general plane of the upper surface (6a), characterized in that the or each rim (60, 80) retracts automatically under the action of a load (F) which biases the or each rim (60, 80) from its rest position towards its working position, the load (F) being placed on the upper surface (6a) of the tray (6) directly above the or each rim (60, 80) and that it has a substantially rectangular shape and comprises two retractable rims (60, 80) arranged parallel to one another in the direction of the small dimension of the tray (6) and further comprises a surface (40), made of wood, covered with a metal sheet (44), and in that said surface is arranged between two slotted end pieces (8, 9), each of the two rims (60, 80) being arranged in the slot (58) of a corresponding end piece (8, 9).

2. Tray according to claim 1, characterized in that at least one of the end pieces (8, 9) comprises at least one recess (56) intended for the storage of objects.

* * * * *